United States Patent
Rakotoharison et al.

(10) Patent No.: US 9,893,796 B2
(45) Date of Patent: Feb. 13, 2018

(54) MOBILE COMMUNICATIONS DEVICE AND SYSTEM

(75) Inventors: Lanto Rakotoharison, Berkshire (GB); Dorin Panaitopol, Berkshire (GB); Thomas Delsol, Berkshire (GB); Caroline Jactat, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/376,250

(22) PCT Filed: Jul. 19, 2012

(86) PCT No.: PCT/JP2012/069054
§ 371 (c)(1),
(2), (4) Date: Mar. 4, 2015

(87) PCT Pub. No.: WO2013/114648
PCT Pub. Date: Aug. 8, 2013

(65) Prior Publication Data
US 2015/0180565 A1 Jun. 25, 2015

(30) Foreign Application Priority Data
Feb. 3, 2012 (GB) .................................. 1201915.4

(51) Int. Cl.
*H04B 7/15* (2006.01)
*H04W 88/04* (2009.01)
(Continued)

(52) U.S. Cl.
CPC ........... *H04B 7/15* (2013.01); *H04L 41/0813* (2013.01); *H04W 12/06* (2013.01); *H04W 88/04* (2013.01); *H04W 60/00* (2013.01)

(58) Field of Classification Search
CPC ....................................................... H04B 7/15
(Continued)

(56) References Cited

U.S. PATENT DOCUMENTS

| 7,363,341 B2* | 4/2008 | Koshino | H04W 88/14 |
|---|---|---|---|
| | | | 709/203 |
| 7,725,599 B2* | 5/2010 | Van Datta | H04L 29/06 |
| | | | 709/200 |

(Continued)

FOREIGN PATENT DOCUMENTS

| CN | 102017672 | 4/2011 |
|---|---|---|
| EP | 2 031 919 A1 | 3/2009 |

(Continued)

OTHER PUBLICATIONS

H. Kubo et al., "Relay Ability Estimation Using Multi-dimensional Context Parameters for Mobile Overlay Networks", IEICE Technical Reort MoMuC2009-73, pp. 1-8, Feb. 2010.
(Continued)

*Primary Examiner* — Andrew Lai
*Assistant Examiner* — Andrew C Lee
(74) *Attorney, Agent, or Firm* — Finnegan, Henderson, Farabow, Garrett & Dunner, L.L.P.

(57) ABSTRACT

A mobile device (7) configured to provide relay capabilities in a communications system (1) by communicating network-level mobile device relaying capabilities and radio-level mobile device relaying capabilities from the mobile device (7) to a communications node (3) of the communications system (1) so that the mobile device (7) can relay communications between the communications node (3) and another mobile device (2). User subscription information related to relaying is also disclosed.

20 Claims, 5 Drawing Sheets

(51) Int. Cl.
  *H04L 12/24* (2006.01)
  *H04W 12/06* (2009.01)
  *H04W 60/00* (2009.01)

(58) Field of Classification Search
  USPC .................. 370/254, 255, 310, 315, 331
  See application file for complete search history.

(56) References Cited

U.S. PATENT DOCUMENTS

| | | | | |
|---|---|---|---|---|
| 8,620,302 B2* | 12/2013 | Gunnarsson | ............ | H04W 8/26 370/315 |
| 8,867,428 B2* | 10/2014 | Ulupinar | .............. | H04B 7/2606 370/315 |
| 8,903,394 B2* | 12/2014 | Shen | .............. | H04B 7/155 370/331 |
| 9,137,833 B2* | 9/2015 | Naoe | .............. | H04W 8/26 |
| 9,270,361 B2* | 2/2016 | Suga | .............. | H04B 7/15542 |
| 9,374,767 B2* | 6/2016 | Bienas | .............. | H04W 48/08 |
| 2002/0122410 A1* | 9/2002 | Kulikov | .............. | H04L 45/302 370/349 |
| 2003/0092443 A1* | 5/2003 | Hiyama | .............. | H04W 88/02 455/435.1 |
| 2003/0125067 A1* | 7/2003 | Takeda | .............. | H04W 52/247 455/522 |
| 2005/0169206 A1* | 8/2005 | Nozaki | .............. | H04W 88/04 370/316 |
| 2005/0177851 A1* | 8/2005 | Murao | .............. | H04H 20/06 725/75 |
| 2005/0227616 A1* | 10/2005 | Takatani | .............. | H04B 7/2606 455/11.1 |
| 2006/0040670 A1* | 2/2006 | Li | .............. | H04L 45/42 455/445 |
| 2007/0066239 A1* | 3/2007 | Hart | .............. | H04W 52/241 455/69 |
| 2007/0070929 A1 | 3/2007 | Kang et al. | | |
| 2008/0045220 A1* | 2/2008 | Ishii | .............. | H04B 7/022 455/438 |
| 2008/0084856 A1* | 4/2008 | Ramachandran | ...... | H04B 7/155 370/342 |
| 2008/0101325 A1* | 5/2008 | Bao | .............. | H04B 7/2606 370/345 |
| 2008/0107076 A1* | 5/2008 | Ramachandran | ... | H04W 40/246 370/331 |
| 2008/0107091 A1* | 5/2008 | Ramachandran | .... | H04B 7/2606 370/338 |
| 2008/0151810 A1* | 6/2008 | Watanabe | .............. | H04L 45/32 370/315 |
| 2008/0175215 A1* | 7/2008 | Oh | .............. | H04B 7/2606 370/338 |
| 2008/0188177 A1* | 8/2008 | Tan | .............. | H04B 7/2606 455/11.1 |
| 2008/0207117 A1* | 8/2008 | Lim | .............. | H04B 7/15557 455/9 |
| 2008/0261563 A1* | 10/2008 | Drevon | .............. | H04W 92/045 455/411 |
| 2008/0305740 A1* | 12/2008 | Horiuchi | .............. | H04B 7/155 455/11.1 |
| 2009/0003261 A1 | 1/2009 | Kim | | |
| 2009/0010199 A1* | 1/2009 | Adachi | .............. | H04W 40/02 370/315 |
| 2009/0015371 A1* | 1/2009 | Bocquet | .............. | G07C 9/00 340/5.2 |
| 2009/0034458 A1* | 2/2009 | Horn | .............. | H04W 88/04 370/329 |
| 2009/0109995 A1* | 4/2009 | Alam | .............. | H04W 84/18 370/463 |
| 2009/0111476 A1* | 4/2009 | Hamalainen | .......... | H04W 72/02 455/450 |
| 2009/0141668 A1* | 6/2009 | Zhang | .............. | H04L 12/4633 370/315 |
| 2009/0161579 A1* | 6/2009 | Saaranen | .............. | H04L 12/2809 370/254 |
| 2009/0181666 A1* | 7/2009 | Viswanath | ........... | H04B 7/2606 455/425 |
| 2009/0201846 A1* | 8/2009 | Horn | ................. | H04W 72/1263 370/315 |
| 2010/0027457 A1* | 2/2010 | Okuda | ................... | H04B 7/155 370/315 |
| 2010/0039947 A1* | 2/2010 | Li | .......................... | H04L 1/0026 370/252 |
| 2010/0167743 A1 | 7/2010 | Palanki et al. | | |
| 2010/0167768 A1* | 7/2010 | Tsutsui | ............... | H04B 7/15542 455/500 |
| 2010/0202343 A1* | 8/2010 | Hunzinger | ............. | H04B 7/155 370/315 |
| 2010/0265872 A1* | 10/2010 | Wu | .................... | H04B 7/15557 370/315 |
| 2010/0273416 A1* | 10/2010 | Yi | ......................... | H04B 7/155 455/9 |
| 2010/0325267 A1* | 12/2010 | Mishra | .................. | H04L 41/069 709/224 |
| 2010/0329188 A1* | 12/2010 | Jen | ....................... | H04B 7/2606 370/328 |
| 2010/0331037 A1* | 12/2010 | Jen | ...................... | H04W 52/146 455/522 |
| 2011/0002304 A1* | 1/2011 | Lee | ........................ | H04W 36/02 370/331 |
| 2011/0038301 A1* | 2/2011 | Park | .................... | H04B 7/2606 370/315 |
| 2011/0078231 A1* | 3/2011 | Oliver | ................... | G06F 9/5055 709/203 |
| 2011/0113157 A1 | 5/2011 | Kim et al. | | |
| 2011/0164536 A1* | 7/2011 | Lin | ....................... | H04B 7/155 370/259 |
| 2011/0238807 A1 | 9/2011 | Lee et al. | | |
| 2011/0305189 A1* | 12/2011 | Chen | .............. | H04B 7/15592 370/315 |
| 2012/0002591 A1* | 1/2012 | Noh | .................. | H04B 7/15557 370/315 |
| 2012/0008776 A1* | 1/2012 | Ishida | ................... | H04W 12/04 380/247 |
| 2012/0039468 A1* | 2/2012 | Ishida | ................... | H04W 12/04 380/247 |
| 2012/0044836 A1* | 2/2012 | Sivavakeesar | ........ | H04W 24/02 370/255 |
| 2012/0076118 A1* | 3/2012 | Montemurro | ......... | H04W 48/16 370/338 |
| 2012/0099461 A1* | 4/2012 | Yi | ......................... | H04B 7/2606 370/252 |
| 2012/0108164 A1* | 5/2012 | Yuda | .................. | H04B 7/15521 455/9 |
| 2012/0114021 A1* | 5/2012 | Chung | .................. | H04B 7/155 375/211 |
| 2012/0147805 A1* | 6/2012 | Kim | ....................... | H04B 7/155 370/312 |
| 2012/0196528 A1* | 8/2012 | Kazmi | ................... | H04W 52/34 455/9 |
| 2012/0238208 A1* | 9/2012 | Bienas | .................... | H04W 8/24 455/41.2 |
| 2012/0331050 A1* | 12/2012 | Wilbur | .................. | G06F 9/5072 709/204 |
| 2013/0005359 A1* | 1/2013 | Bourakov | ............. | G06Q 30/02 455/456.3 |
| 2013/0070739 A1* | 3/2013 | McCann | ............... | H04W 48/16 370/338 |

FOREIGN PATENT DOCUMENTS

| | | |
|---|---|---|
| JP | 2006-186526 | 7/2006 |
| JP | 2008-131517 | 6/2008 |
| JP | 2011-520383 | 7/2011 |
| JP | 2012-54732 | 3/2012 |
| JP | 2012-54879 | 3/2012 |
| WO | WO 2008/032709 A1 | 3/2008 |
| WO | WO 2010/125982 A1 | 11/2010 |
| WO | WO 2011/055780 A1 | 5/2011 |

(56) References Cited

FOREIGN PATENT DOCUMENTS

| WO | WO 2011/083663 A1 | 7/2011 |
|---|---|---|
| WO | WO 2011/102772 A1 | 8/2011 |

OTHER PUBLICATIONS

3GPP TSG-SA WG1 Meeting #56, S1-113135, "FS_ProSe Use Case: Safety support", Nov. 2011.

3GPP TSG-SA WG1 Meeting #56, S1-113143, "Range extension scenarios for Proximity services", Nov. 2011.

3GPP TSG-SA WG1 Meeting #56, S1-113144, "Enabling Firewall traversal for operator hosted services: Use cases and discussion", Nov. 2011.

Search Report in corresponding GB Application No. GB1201915.4 dated Jul. 11, 2012.

CMCC, "The startup procedure of relay", 3GPP TSG-RAN WG2 Meeting #68, R2-096986, pp. 1-3, Nov. 2009.

Extended European Search Report dated Oct. 16, 2015 by the European Patent Office in counterpart European Patent Application No. 12867081.7.

First Office Action in counterpart Chinese Application No. 201280068741.2, dated Apr. 28, 2017.

Notification of Reasons for Refusal issued by the Japanese Patent Office in counterpart Japanese Patent Application No. 2016-251245, dated Apr. 18, 2017.

3GPP TSG CT WG1 Meeting #75, C1-114776, "Clarification of definition related to subscribed APN Based Congestion Control", pp. 2-8, (2011).

Notification of Reason for Refusal dated Sep. 12, 2017, by the Japanese Patent Office in counterpart Japanese Patent Application No. 2016-251245.

* cited by examiner

MOBILE COMMUNICATIONS DEVICE AND SYSTEM

TO RELATED PATENT APPLICATIONS

This application is a National Stage Entry of International Application No. PCT/JP2012/069054, filed Jul. 19, 2012, which claims priority from British Patent Application No. 1201915.4, filed Feb. 3, 2012. The entire contents of the above-referenced applications are expressly incorporated herein by reference.

TECHNICAL FIELD

The present invention relates to mobile communications system and to mobile devices and networks, particularly but not exclusively those operating according to the 3GPP (Third Generation Partnership Project) standards or equivalents or derivatives thereof. The invention has particular although not exclusive relevance to the Long Term Evolution (LTE) of UTRAN (called Evolved Universal Terrestrial Radio Access Network (E-UTRAN)), for example as currently defined in 3GPP standards documentation TS 23.401 (SA2), 36.300, 36.331 (RAN2). 36.413 (RAN3), 24.301, 27.007 (CT1), and 29.272 (CT4).

BACKGROUND ART

Relaying is considered for LTE-Advanced as a tool to improve, for example, the coverage of high data rates for User Equipment (UE), group mobility, temporary network deployment, cell edge throughput and/or to provide coverage in new cell areas. E-UTRAN supports relaying by having a Relay Node (RN) wirelessly connected to a base station (eNB) (referred to as a Donor eNB (DeNB)). In addition to serving its own 'donor' cell, the DeNB serves the RN, via a modified version of the E-UTRA radio interface. The modified interface is referred to as the 'Un' interface or the 'RN-Un' interface. Although the RN may be fixed or mobile, it is, nevertheless, a base station and is provided with many aspects of a base station's functionality and is therefore capable of acting as a base station serving UE in its own 'relay' cell via a wireless interface referred to as the 'RN-Uu' interface. From the perspective of the UE in the relay cell, therefore, the RN essentially appears to be a conventional LTE base station.

SUMMARY OF INVENTION

Technical Problem

Nevertheless, situations may well arise where a UE cannot properly communicate with either a base station or an RN. For example, various factors, such as environment, path loss, power limitation, may limit cell coverage, or, indeed, the UE may be in an environment, where communication with the base station or RN is very problematic. At recent 3GPP meetings, it has been proposed, for public safety purposes to utilize specially configured UEs themselves as relays for other UEs. For example, as discussed at 3GPP TSG-SA WG1 Meeting #56 in San Francisco, Calif., 14-18 Nov. 2011 and described in documents S1-113135, S1-113143 and S1-113144 (3GPP TR 22.8xx V0.1.0), a UE can be enabled for Proximity-based Services (ProSe). Such a ProSe enabled UE could be able to act for safety purposes as a relay of direct communication towards the network for UEs unable to access the network. A safety enabled UE without access to the network but with ProSe access to another UE with relay capability and with access to the network would be able to interact with that UE to establish direct communication for relay. Of course, ProSe functionality has been concerned, in general, with communication between UEs that are in proximity to each other and may enable social networking applications between them.

The present invention therefore seeks to provide a system and a mobile device that provide efficient relay configuration.

Solution to Problem

Accordingly, in a first aspect, the invention provides a method of providing relay capabilities in a wireless communication system, the method comprising receiving mobile device relaying capability information about a particular mobile device, updating at a network controller of the communications system, a stored context for the particular mobile device with the mobile device relaying capability information for that mobile device indicating that the particular mobile device can be used as a relay for relaying communications for another mobile device, and configuring the wireless communication system to enable the particular mobile device to be used to provide relay functionality based on the updated stored context to relay communications for another mobile device.

In one preferred embodiment, after receiving the mobile device relaying capabilities about a particular mobile device, the method comprises checking whether a user of the particular mobile device has granted consent to the use of the particular mobile device as a relay and only updating the stored context that the particular mobile device can be used as a relay, if the user has granted consent.

The consent to the use of the particular mobile device as a relay may be provided in subscription information for the particular mobile device stored in a home subscriber server for the particular mobile device.

The method may further comprise obtaining relaying subscription information about the particular mobile device from the home server if the consent has been granted.

In an embodiment, the user can change whether consent to the use of the particular mobile device as a relay is given, and may be able to temporarily change consent that has been given.

The mobile device relaying capability information may comprise network-level mobile device relaying capabilities, which may comprise a level of relay capability indicating whether the particular mobile device can be used for all communications or for only a subset of communications. The network-level mobile device relaying capabilities may be received in a Non-Access Stratum (NAS) message.

The mobile device relaying capability information may comprise radio-level relaying capabilities about the particular mobile device, which may be received in an Access Stratum (AS) message.

The method may further comprise utilizing the particular mobile device as a relay for communications to another mobile device based at least in part on the mobile device relaying capability information.

According to another aspect, the present invention provides a mobile communications device for use in a communications system, comprising means for communicating mobile device relaying capability information to a communications node of the communications system, and means for providing relay communications for another mobile device.

The relay communications may be provided between another mobile device and either the communications node or another relay device of the communications system.

The mobile device relaying capability information may comprise network-level mobile device relaying capabilities, which may comprise a level of relay capability indicating whether the particular mobile device can be used for all communications or for only a subset of communications. The network-level mobile device relaying capabilities may be transmitted in a Non-Access Stratum (NAS) message and may be communicated during registration with the communications node.

The mobile device relaying capability information may comprise radio-level relaying capabilities about the particular mobile device, which may be transmitted in an Access Stratum (AS) message.

The radio-level relaying capabilities may comprise information regarding any one or more of supported carrier frequencies, supported frequency bands and supported radio access technologies.

The radio-level capability information may be communicated following a device capability enquiry during registration with the communications node. The network-level mobile device relaying capabilities may be communicated during registration with the communications node.

In one embodiment the mobile communications device may further comprise means for temporarily disabling the means for providing relay communications for another mobile device. The means for temporarily disabling the means for providing relay communications for another mobile device may comprise a user interface or an AT (Terminal Equipment to Terminal Adaptor) command interface.

In a further aspect, the invention provides a network controller for use in a wireless communication system, the network controller comprising means for receiving mobile device relaying capability information about a particular mobile device, means for updating a stored context for the particular mobile device with the mobile device relaying capability information for that mobile device indicating that the particular mobile device can be used as a relay for relaying communications for another mobile device, and means for configuring the wireless communication system to enable the particular mobile device to be used to provide relay functionality based on the updated stored context to relay communications for another mobile device.

The network controller may further comprise means for checking whether a user of the particular mobile device has granted consent to the use of the particular mobile device as a relay and only updating the stored context that the particular mobile device can be used as a relay, if the user has granted consent.

The mobile device relaying capability information may comprise network-level mobile device relaying capabilities, which may comprise a level of relay capability indicating whether the particular mobile device can be used for all communications or for only a subset of communications.

The mobile device relaying capability information may comprise radio-level relaying capabilities about the particular mobile device.

A further aspect of the invention provides a base station for use in a wireless communication system, the base station comprising means for receiving mobile device relaying capability information about a particular mobile device, means for forwarding the mobile device relaying capability information to a network controller of the wireless communication system, means for receiving, from the network controller, a request for radio-level relaying capabilities about the particular mobile device, means for obtaining radio-level relaying capabilities from the particular mobile device, and means for forwarding the radio-level relaying capabilities obtained from the particular mobile device to the network controller.

Another aspect of the invention provides a subscriber server for use in a wireless communication system, the subscriber server comprising means for receiving, from a network controller, a request for information about a particular mobile device, means for checking whether a user of the particular mobile device has granted consent to the use of the particular mobile device as a relay, and means for forwarding relaying information for that particular mobile device if the user has granted consent.

According to a further aspect, the invention provides a communications system comprising a communications node for communicating with at least one mobile device, a mobile device as described above, and a network controller as described above coupled to the communications node. The communications system may further comprise a base station as described above and/or a subscriber server as described above.

As used herein, a mobile device may be a mobile telephone device, such as a UE in a 3GPP system, a netbook, laptop computer, or any other mobile electronic device configured to transmit and receive data (whether voice or other) on a wireless network.

Advantageous Effects of Invention

According to the present invention, it is possible to at least provide a system and a mobile device that provide efficient relay configuration.

DESCRIPTION OF EMBODIMENTS

Embodiments of the invention will now be more fully described, by way of example, with reference to the drawings.

Figure 1:
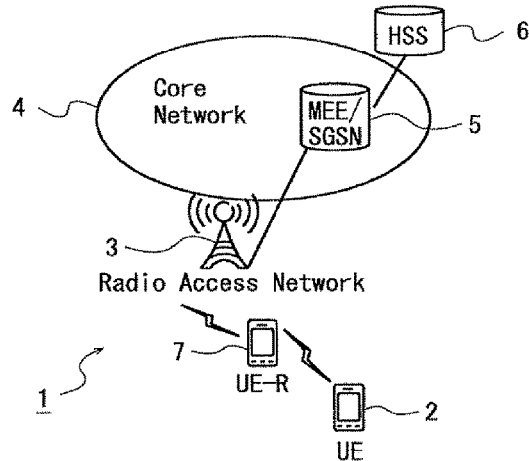
FIG. 1 schematically illustrates a mobile telecommunication system of a type to which the embodiment is applicable.

Thus, FIG. 1 schematically illustrates a mobile (cellular) telecommunication system 1 in which users of mobile devices 2 can communicate with other users (not shown) via a base station 3 and a telephone network 4. As shown in FIG. 1, the base station 3 is directly connected to the core network

4. The system may be a 3GPP LTE system, where the mobile devices are known as User Equipment (UE) and the core network includes a Mobile Management Entity, MME, 5, which is coupled to a Home Subscriber Server, HSS, 6, which may, or may not be within the core network 4. However, the system need not be a 3GPP LTE system, but may be a 2G or 3G system, where the MME may be replaced by a Serving GPRS Support Node (SGSN), for example. However, the present embodiment will be further described in the context of a 3GPP LTE system.

Accordingly, as shown schematically in FIG. 1, the UE 2 is too far away, or in an environment where it cannot (or cannot properly) communicate directly with the base station 3. Therefore, another UE that is in a location where it can communicate directly with both the base station 3 and the UE 2 is used as a relay for the communications between the UE 2 and the base station 3. The relaying UE (known as UE-R) 7 thereby improves the coverage of the base station to enable the network to provide communication coverage for UEs that are not in good direct communication with a base station.

In order to allow the network to properly utilize such UE-Rs in an efficient way (for example, to have a sufficient cell deployment and optimal resource usage), the network should know which UEs are capable of providing a relay function to relay data to/from other UEs. Since not all UEs may have such relaying functionality, the network needs to know the relaying capabilities of a UE-R, including whether it has any relaying functionality and, if so, the level of relaying functionality that it is capable of and the UE radio capabilities, so that the network can configure the UE-R according to the required network deployment.

Figure 2:
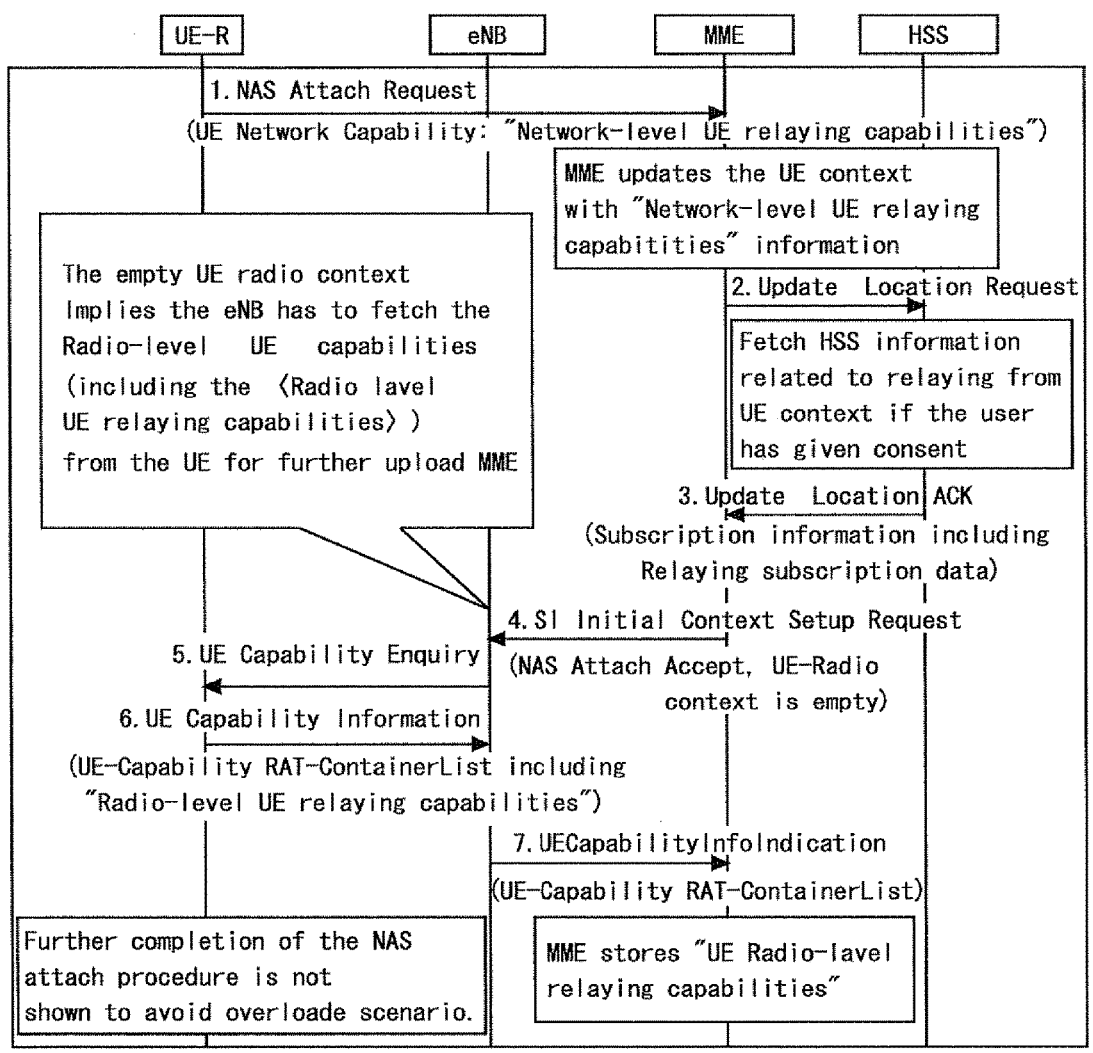
FIG. 2 shows a flow diagram illustrating, in general terms, a procedure for registration of a mobile device in the mobile telecommunication system of FIG. 1.

FIG. 2 shows a schematic flow diagram of a registration procedure for a UE with relay capability, such as UE-R 7, when it first registers with a network 4. As can be seen, the UE-R sends an Attach Request message (as is known) via the Non-Access Stratum (NAS) via the base station 3 (in this case the evolved NodeB (eNB) base station, to the MME 5. In a 3GPP LTE network, the role of the eNB 3 (which is part of the Radio Access Network) is to transmit/receive the data and signaling between the Core Network 4 and the UEs 2 which are under its radio cell coverage. The UEs 2 need to transmit/receive data and/or signaling to/from the eNB 3 whenever a communication is required (for example, to register, update registration, establish a data session, or a voice call). When registering with the network 4, a UE 2 sends UE Network Capabilities to the MME 5 in order for the MME 5 to know how to configure communications with the UE 2. UE Network Capabilities may include general UE Non Access Stratum characteristics to provide the network with information concerning aspects of the UE related to Evolved Packet System or interworking with GPRS. The contents might affect the manner in which the network handles the operation of the UE. In current 3GPP TS 24.301, the UE Network Capabilities includes information about UE EPS supported security algorithms, and UE support of Single Radio Voice Call Continuity. In one embodiment, the UE 2 stores Network-level UE Relaying Capabilities together with the UE Network Capabilities and forwards them to the MME in the NAS Attach Request. The Network-level UE relaying Capabilities includes information regarding the relaying capabilities of the UE, which may affect the manner in which the network utilizes the relay operation using that UE, for example, whether the UE can be used as a relay for emergencies and/or for other uses. Of course, the Network-level UE relaying Capabilities need not be sent in the NAS Attach Request message, but could be sent via any other NAS level information message or using other messages. The Network-level UE relaying Capabilities can be sent to the MME during the NAS registration procedure, or be included in other NAS messages sent by the UE. The Network-level UE relaying Capabilities are then stored in the Core Network 4 (e.g. the MME 5) in order to be able to use the relaying functionality of the UE-R 7.

The MME 5, upon receiving the NAS Attach Request message, performs a UE Update Location procedure with the HSS 6 by sending an Update Location Request to the HSS 6. At this point, according to a preferred embodiment, the HSS 6 determines whether the user of the UE has given consent for the UE to be used by the network for relaying purposes. Such consent may be included in subscriber relaying information stored together with Subscriber Information in the HSS 6. If, upon receipt of the Update Location Request message, the HSS 6 determines that the user has such consent from the user of the UE for the UE to be used as a relay for other UEs, the subscriber relaying information can be made available by the HSS 6 to the MME 5 for storage in the MME 5. It will be apparent that the subscriber information can be associated with the IMSI number of the UE and the HSS 6 may store, associated with the IMSI a field that indicates whether the subscriber has consented to the relaying function. If the field indicates that such consent has been given, then relaying subscription data can be stored in a further field associated with the IMSI and this further subscription data would then be accessible by the HSS 6 to transmit to the MME 5. If the consent field indicates that consent has not been given, then the relaying subscription data field may not be accessible. Of course, if desired, the system could be set up such that the relaying subscription data may be made available in the event of an emergency irrespective of whether consent has been given or not, but may not be so set up. Accordingly, if the HSS 6 determines that access to the relaying subscription information may be granted, it sends that information to the MME 5, possibly in an Update Location Acknowledgement message.

The MME 5 then saves the Subscription Information, including the relaying subscription information received from the HSS 6 in a context for the UE-R 7 and transmits an S1 Initial Context Setup Request to the eNB 3. During initial registration, the context for that UE-R 7 would be empty, so the eNB 3 requests Radio-level Access Capabilities from the UE-R 7, which provides its Radio-level Access Capabilities, including Radio-level Relaying Capabilities, back to the eNB 3, which transmits them back to the MME 5, where they are stored in the UE-R context. The Radio-level Relaying Capabilities comprises information at radio AS (Access Stratum) level and generally includes information regarding supported carrier frequencies, supported frequency bands and/or supported radio access technologies, such as 3GPP and/or non-3GPP radio access technologies. This information is used by the network to configure the radio bearers of both the UEs and the UE-Rs for relaying purposes. For example, a non-3GPP technology could be used for the relaying function if both the relaying and the relayed UEs support it. Alternatively, if a network operator decides to use dedicated bands for relaying, the eNB must take into account both the dedicated bands and the UE-R's relaying radio capabilities, when configuring the UEs and UE-Rs for relaying. The Radio-level Relaying Capabilities may be included in the UE's Radio-level Access Capabilities container and signaled in a Radio Resource Control (RCC) message by the UE to the eNB. Such an RRC message may be the UE Capability Information message that is sent in response to a UE Capability Enquiry sent by the eNB.

Figure 3:
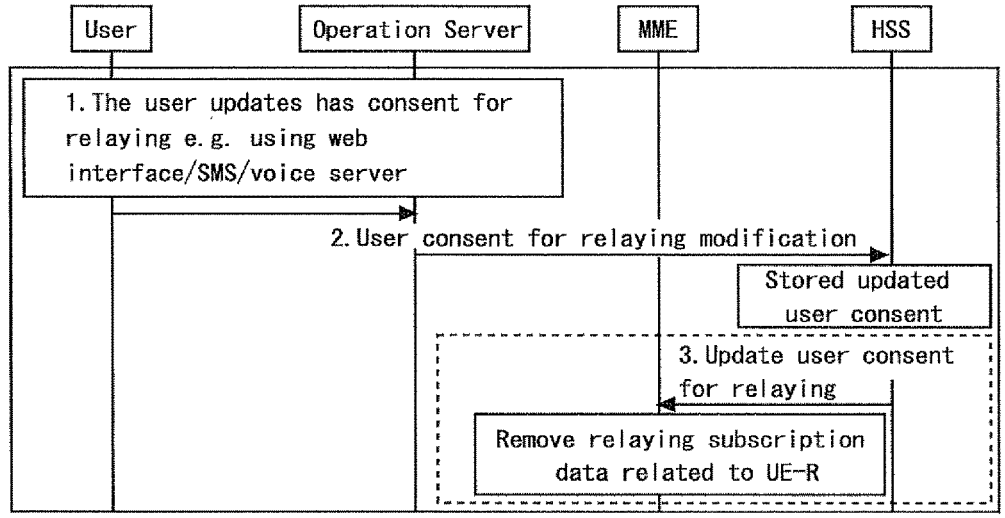
FIG. 3 shows a flow diagram illustrating, in general terms, a procedure for modifying consent in the mobile telecommunication system of FIG. 1.

As mentioned above, both the Network-level UE relaying Capabilities and the Radio-level Relaying Capabilities are stored in the MME in the Core Network, together with the Subscription Information from the HSS for the particular UE-R. The consent given or not given by the subscriber owning a particular UE to its use as a UE-R can be changed, of course. If, for example, the subscriber wishes to withdraw consent to the use of the UE as a UE-R, as shown in FIG. 3, the subscriber can contact the Service Provider, either by an internet web server interface, SMS, voice call or in any other suitable manner, to advise the Operator Server that consent has been withdrawn. In such a case, the Operator Server updates the HSS field associated with the UE IMSI and the HSS updates the MME with the information that the consent has been withdrawn. The MME then updates the UE context by marking it as no longer being available for use as a UE-R, for example, if the MME itself stores the consent in the UE context, or by removing the Subscription Information from the UE context altogether.

Figure 5:
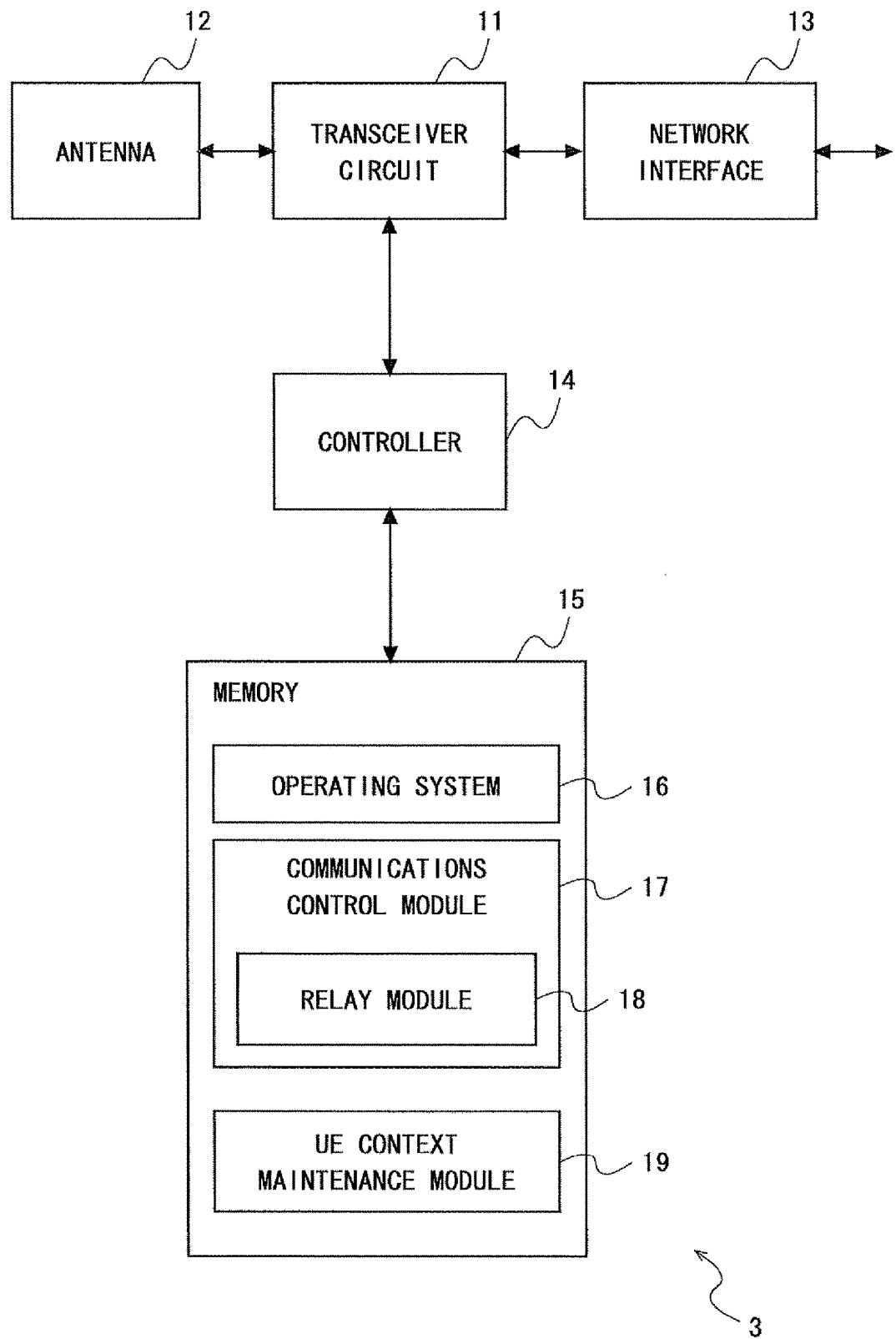
FIG. 5 is a block diagram illustrating the main components of the base station illustrated in FIG. 1.

FIG. 5 is a block diagram illustrating the main components in the base station 3 shown in FIG. 1. As shown, the base station 3 includes a transceiver circuit 11 which is operable to transmit signals to, and to receive signals from, UEs over a conventional Uu interface via at least one antenna 12. The base station 3 is also operable to transmit signals to and to receive signals from the core network 4 via a network interface 13. The operation of the transceiver circuit 11 is controlled by a controller 14 in accordance with software stored in memory 15.

The software includes, among other things, an operating system 16, a communications control module 17 including a relay module 18, and a UE context maintenance module 19.

The communications control module 17 is operable to control communication with UEs and UE-Rs including, for example, allocation of resources to be used by the transceiver circuit 11 in its communications with the UEs and the UE-Rs. The communications control module 17 also schedules the times for the transmission of downlink data to the UEs and UE-Rs. The relay module 18 of the control module 17 controls the configuration of the UEs that are to be used as UE-Rs and configuration of UE-Rs, as well as the communications with UE-Rs that are being used as relays for communications with other UEs.

A UE context maintenance module 19 maintains the context of the UE-R 7 as received from the MME 5 to allow the base station 3 to carry out device identity mapping, and to provide the various relay capabilities to the relay module 18, as needed.

Figure 6:
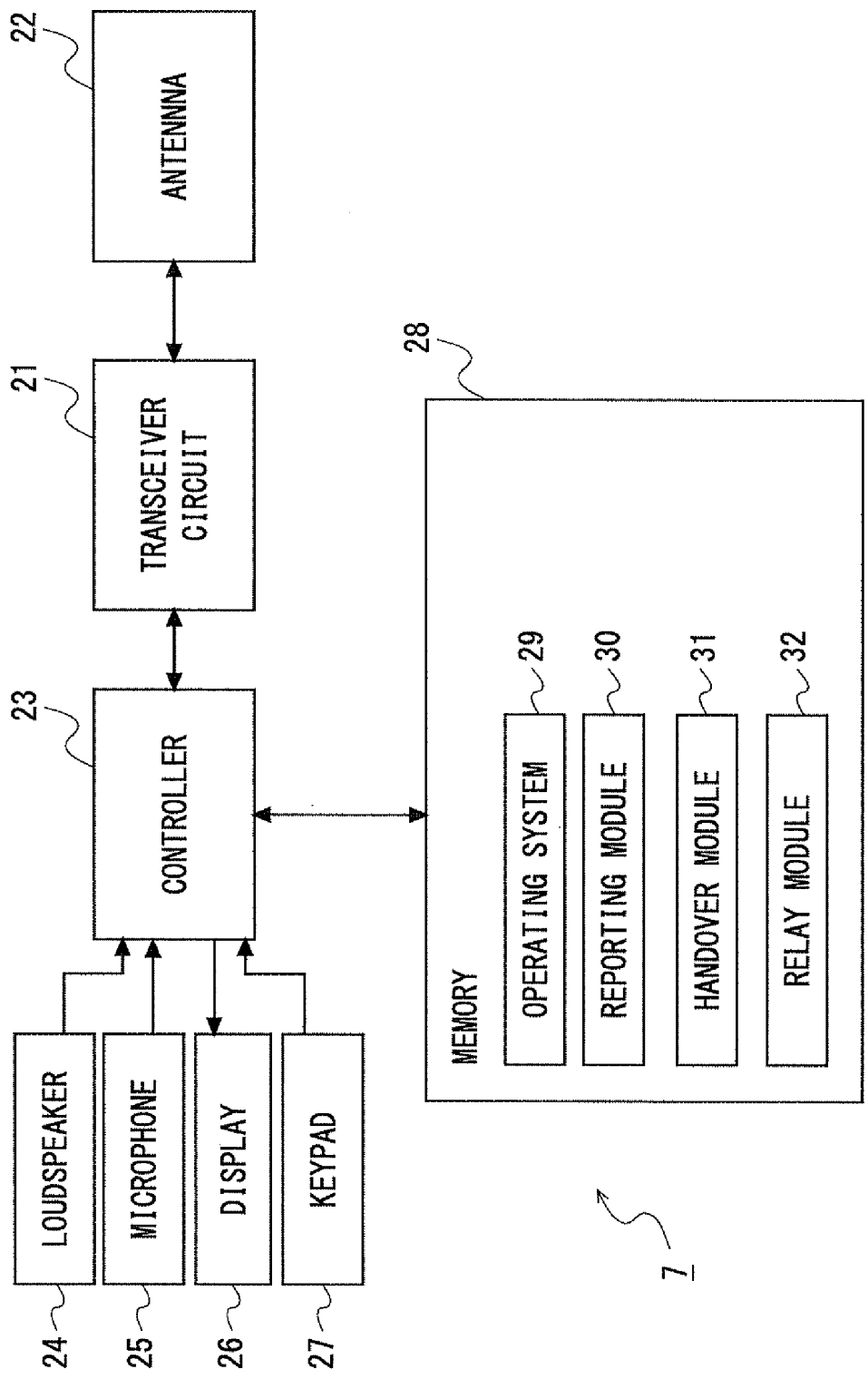
FIG. 6 schematically illustrates a mobile device for use in the system shown in FIG. 1.

FIG. 6 schematically illustrates the main components of each mobile device 7 shown in FIG. 1. As shown, the mobile device 7 includes transceiver circuitry 21 which is operable to transmit signals to and to receive signals from the base station 3 via one or more antennas 22. As shown, the mobile device 7 may includes a controller 23 which controls the operation of the mobile device 7 and which may be connected to the transceiver circuit 21 and may further be connected to a loudspeaker 24, a microphone 25, a display 26, and a keypad 27. The controller 23 operates in accordance with software instructions stored within memory 28. As shown, these software instructions include, among other things, an operating system 29, a reporting module 30, a handover module 31 and a relay module 32.

In this embodiment: the reporting module 30 is operable to report the occurrence of specified events back to the serving base station 3, the handover module 31 is operable to control the handover of the mobile device 7 from one cell to another and the relay module 32 is operable to control and configure the functionality of the UE as a UE-R. In one embodiment, the UE-R 7 can allow a user of the UE-R to temporarily disable relay functionality, for example to reduce power consumption. This can be done, for example, by the relay module 32 providing the user with relay ON/OFF capability via a user interface formed by at least the display 26 and keypad 27 so that the user can turn off the relay functionality without changing the consent status at the HSS. The relay module 32 interfaces between the application layer (the user interface) and the NAS so that NAS updates any impacted Network-level UE relaying Capabilities in the UE. An AT command (being a command from Terminal Equipment (TE), such as a computer, to a Terminal Adaptor (TA)) could be used to enable or disable relay functionality, for example. The AT command could be used for configuring Mobile Termination relaying functions from TE to a TA. Any affected NAS (or AS) capabilities for the relaying function would then be updated according to the user choice. Any updates to the Network-level UE relaying Capabilities will also be transferred to the MME, as will be further described below.

Figure 4:
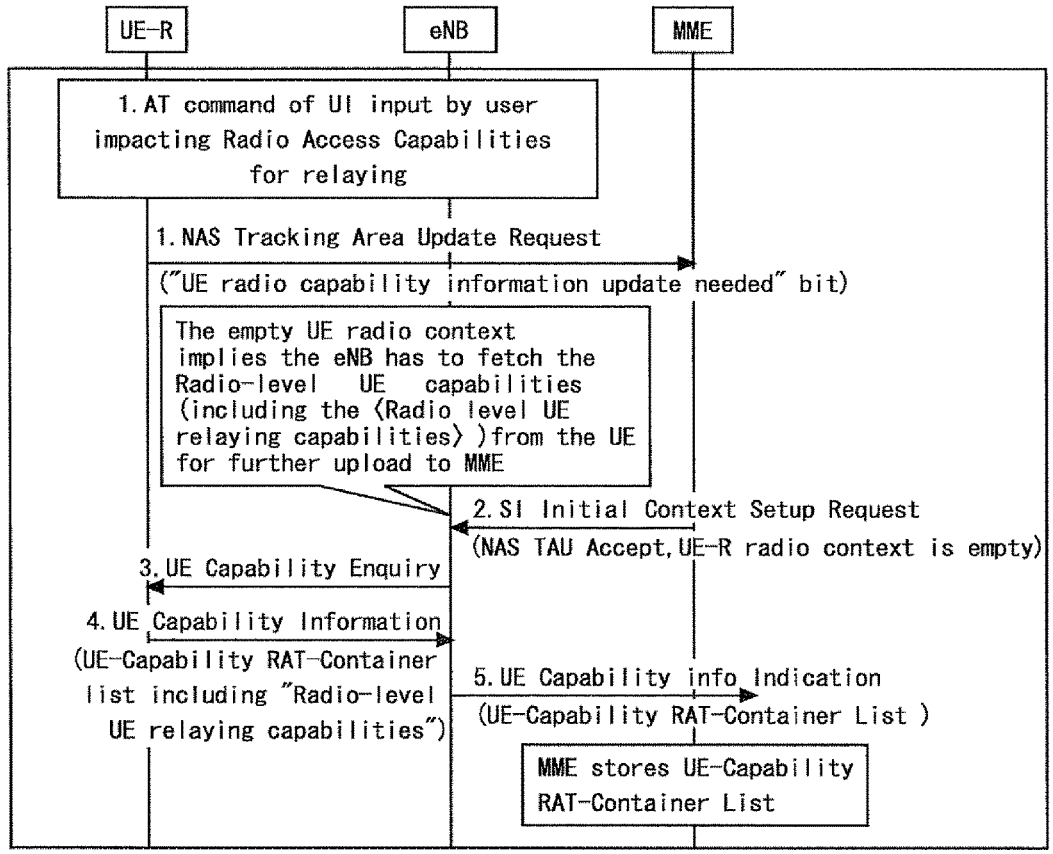
FIG. 4 shows a flow diagram illustrating, in general terms, a procedure for updating radio access relaying capabilities in the mobile telecommunication system of FIG. 1.

FIG. 4 illustrates a scenario where the UE-R configuration is updated via a User Interface or AT command. If the change impacts the UE radio relaying capabilities, then the MME is informed via a NAS Tracking Area Update procedure in which an "Update of the radio capability information needed" bit is set. The MME thus triggers the eNB to fetch from the UE-R updated Radio-level Access Capabilities, including Radio-level Relaying Capabilities, which are then uploaded to the MME and updated in the UE context.

Figure 7:
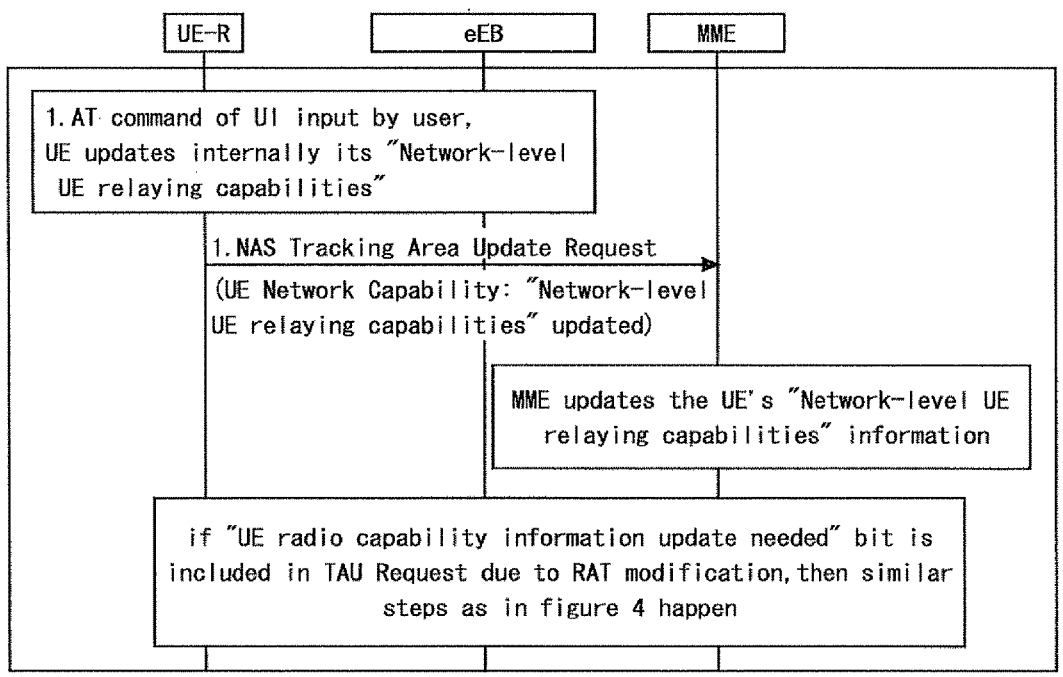
FIG. 7 shows a flow diagram illustrating, in general terms, a procedure for updating network level mobile device relaying capabilities in the mobile telecommunication system of FIG. 1.

Similarly, as shown in FIG. 7, if the UE-R configuration is updated via a User Interface or AT command and the change impacts the Network-level UE relaying Capabilities, then the MME is informed via the NAS Tracking Area Update procedure including the updated Network-level UE relaying Capabilities further to which the MME updates the UE context.

It will be seen, therefore, that various embodiments allow the network to determine the relay capabilities of any relay capable UEs based on the Network-level UE relaying Capabilities provided by such UEs. This allows the network to operate more efficiently. A user can change the relay capabilities of the UE-R temporarily and such changes are notified to the network, where they can be taken into account in determining relaying. Since the user may also need to grant consent to the use of the UE as a UE-R, which consent is included in the subscriber information, a user can more permanently change whether the UE is permitted to be used for relay functions. Since the network knows which UEs are UE-Rs and their relaying capabilities, it can use such UE-Rs to increase the coverage of the network. This could be independent of any subscription and/or roaming rights of the user of the UE-R being so used, since the network can configure the UE to be used as a UE-R, as needed based on the requirements of the network configuration/policy and the capabilities of nearby UEs which require relaying. It is also possible for such network configuration of UE-Rs to be carried out irrespective of whether consent by the user has been granted, for example in the case of emergencies.

It will be appreciated that although only one particular embodiment of the invention has been described in detail, various modifications and improvements can be made by a person skilled in the art without departing from the scope of the present invention. For example, it is possible for consent to be granted or withheld at different levels of relay capability. It may be, that a user is willing to grant consent for use for emergency purposes only, or for only certain uses, or for all uses. For example, if the user belongs to a particular group of users, consent may be given for relaying capabilities to be provided between mobile devices or users belonging to that group, but not for other users or devices. Such consent to particular levels of relaying capability may be included in the Subscription Information and stored in the HSS, as described above, and the MME is then only authorized to utilize the UE-R according to the level of relaying capability for which consent has been granted, but not for any other level of relaying capability.

This application is based upon and claims the benefit of priority from United Kingdom Patent Application No. 1201915.4, filed on Feb. 3, 2012, the disclosure of which is incorporated herein in its entirety by reference.

INDUSTRIAL APPLICABILITY

The present invention can be applied to a method of providing mobile communications system and to mobile devices and networks.

REFERENCE SIGNS LIST

1 MOBILE (CELLULAR) TELECOMMUNICATION SYSTEM
2 MOBILE DEVICES (UE)
3 BASE STATION (eNB)
4 CORE NETWORK
5 MOBILE MANAGEMENT ENTITY (MME)
6 HOME SUBSCRIBER SERVER (HSS)
7 MOBILE DEVICES (UE: KNOWN AS UE-R)
11 TRANSCEIVER CIRCUIT
12 ANTENNA
13 NETWORK INTERFACE
14 CONTROLLER
15 MEMORY
16 OPERATION SYSTEM
17 CONTROL MODULE
18 RELAY MODULE
19 UE CONTEXT MAINTENANCE MODULE
21 TRANSCEIVER CIRCUIT
22 ANTENNAS
23 CONTROLLER
24 LOUDSPEAKER
25 MICROPHONE
26 DISPLAY
27 KEYPAD
28 MEMORY
29 OPERATING SYSTEM
30 REPORTING MODULE
31 HANDOVER MODULE
32 RELAY MODULE

The invention claimed is:

1. A user equipment (UE) for use in a wireless communication system, the UE comprising:
a transceiver; and
a controller configured to:
control the transceiver to transmit, to a base station, UE capability information regarding capability of the UE; and
control the transceiver to provide relay communication for another UE;
wherein the UE capability information includes first relay capability information which indicates a capability of the UE to act as a Proximity-based Services (ProSe) UE to provide network relaying; and
wherein the first relay capability information, which indicates a capability of the UE to act as a Proximity-based Services (ProSe) UE to network relay, is transmitted in a Non-Access Stratum (NAS) message.

2. The UE according to claim 1, wherein the UE capability information further includes second relay capability information which indicates relay capability between the UE and the another UE.

3. The UE according to claim 2, wherein the controller is further configured to: control the transceiver to transmit the second capability information in a NAS message.

4. The UE according to claim 1, wherein the UE capability information is transmitted to a Mobile Management Entity (MME) via the base station.

5. The UE according to claim 1, wherein the controller is further configured to: control the transceiver to transmit the UE capability information in an attach request message or in a Tracking Area Update Request message.

6. A base station for use in a wireless communication system, the base station comprising:
a transceiver; and
a controller configured to:
control the transceiver to receive, from a user equipment (UE), UE capability information regarding capability of the UE;
wherein the UE capability information includes first relay capability information which indicates a capability of the UE to act as a Proximity-based Services (ProSe) UE to provide network relaying; and
wherein the first relay capability information, which indicates a capability of the UE to act as a Proximity-based Services (ProSe) UE to network relay, is transmitted in a Non-Access Stratum (NAS) message.

7. The base station according to claim 6, wherein the UE capability information further includes second relay capability information which indicates relay capability between the UE and the another UE.

8. The base station according to claim 7, wherein the controller is further configured to control the transceiver to transmit the second capability information in a NAS message.

9. The base station according to claim 6, wherein the controller is further configured to: control the transceiver to transmit, to a Mobile Management Entity (MME), the UE capability information received from the UE.

10. The base station according to claim 6, wherein the controller is further configured to: control the transceiver to receive the UE capability information in an attach request message or in a Tracking Area Update Request message.

11. A method for a user equipment (UE), including a transceiver and a controller, used in a wireless communication system, the method comprising:
controlling the transceiver to transmit, to a base station, UE capability information regarding capability of the UE; and
controlling the transceiver to provide relay communication for another UE;
wherein the UE capability information includes first relay capability information which indicates a capability of the UE to act as a Proximity-based Services (ProSe) UE to provide network relaying; and
wherein the first relay capability information, which indicates a capability of the UE to act as a Proximity-based Services (ProSe) UE to network relay, is transmitted in a Non-Access Stratum (NAS) message.

12. The method according to claim 11, wherein the UE capability information includes second relay capability information which indicates relay capability between the UE and another UE.

13. The method according to claim 12, further comprising:
controlling the transceiver to transmit the second capability information in a NAS message.

14. The method according to claim 11, further comprising:
transmitting the UE capability information to a Mobile Management Entity (MME) from the base station.

15. The method according to claim 11, further comprising:
controlling the transceiver to transmit the UE capability information in an attach request message or in a Tracking Area Update Request message.

16. A method for a base station, including a transceiver and a controller, used in a wireless communication system, the method comprising:
controlling the transceiver to receive, from a user equipment (UE), UE capability information regarding capability of the UE;
wherein the UE capability information includes first relay capability information which indicates a capability of the UE to act as a Proximity-based Services (ProSe) UE to provide network relaying; and
wherein the first relay capability information, which indicates a capability of the UE to act as a Proximity-based Services (ProSe) UE to network relay, is transmitted in a Non-Access Stratum (NAS) message.

17. The method according to claim 16, wherein the UE capability information includes second relay capability information which indicates relay capability between the UE and another UE.

18. The method according to claim 17, further comprising:
controlling the transceiver to transmit the second capability information in a NAS message.

19. The method according to claim 16, further comprising:
controlling the transceiver to transmit, to a Mobile Management Entity (MME), the UE capability information received from the UE.

20. The method according to claim 16, further comprising:
controlling the transceiver to receive the UE capability information in an attach request message or in a Tracking Area Update Request message.

* * * * *